Sept. 21, 1954   E. D. WILKERSON   2,689,403
VEHICLE WHEEL ALIGNMENT TESTING APPARATUS AND
METHOD OF TESTING VEHICLE WHEEL ALIGNMENT
Filed Aug. 20, 1946   6 Sheets-Sheet 3
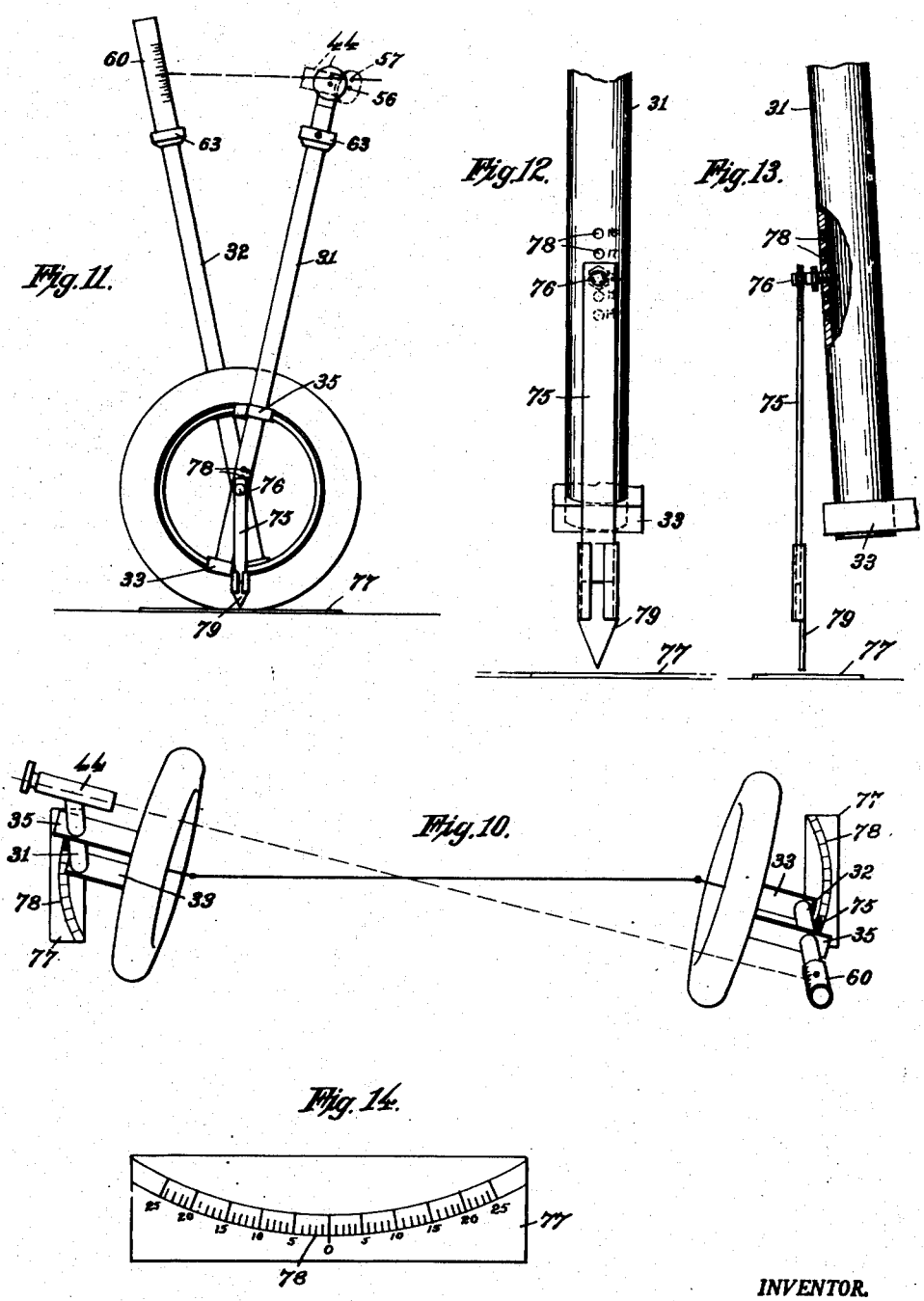
INVENTOR.
*Edward D. Wilkerson*
BY
*Mason, Porter, Diller & Stewart*
ATTORNEYS Sept. 21, 1954   E. D. WILKERSON   2,689,403
VEHICLE WHEEL ALIGNMENT TESTING APPARATUS AND
METHOD OF TESTING VEHICLE WHEEL ALIGNMENT
Filed Aug. 20, 1946   6 Sheets-Sheet 5
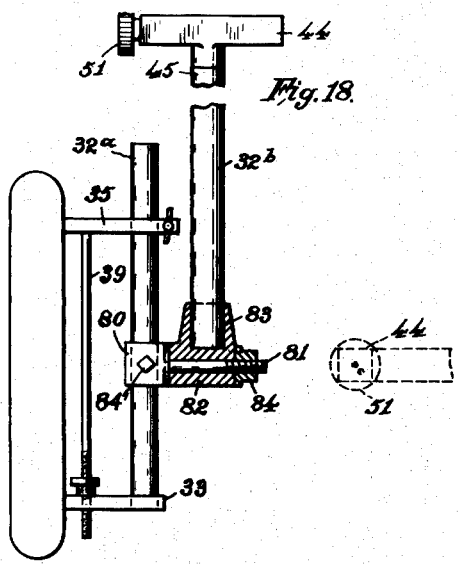
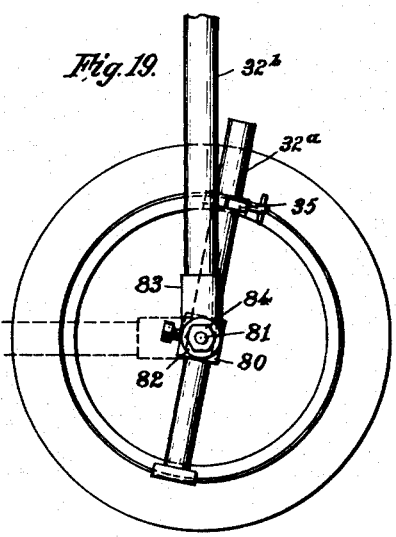
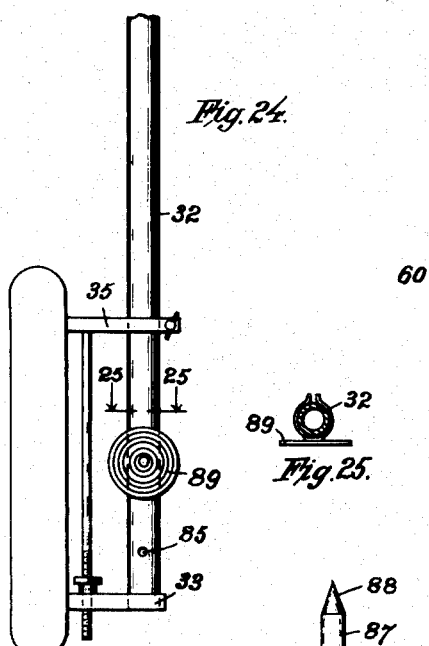
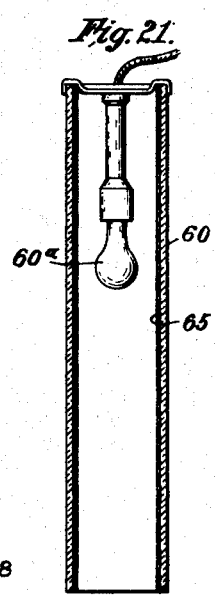
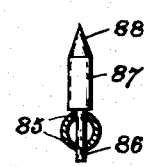
INVENTOR.
Edward D. Wilkerson
BY
ATTORNEYS

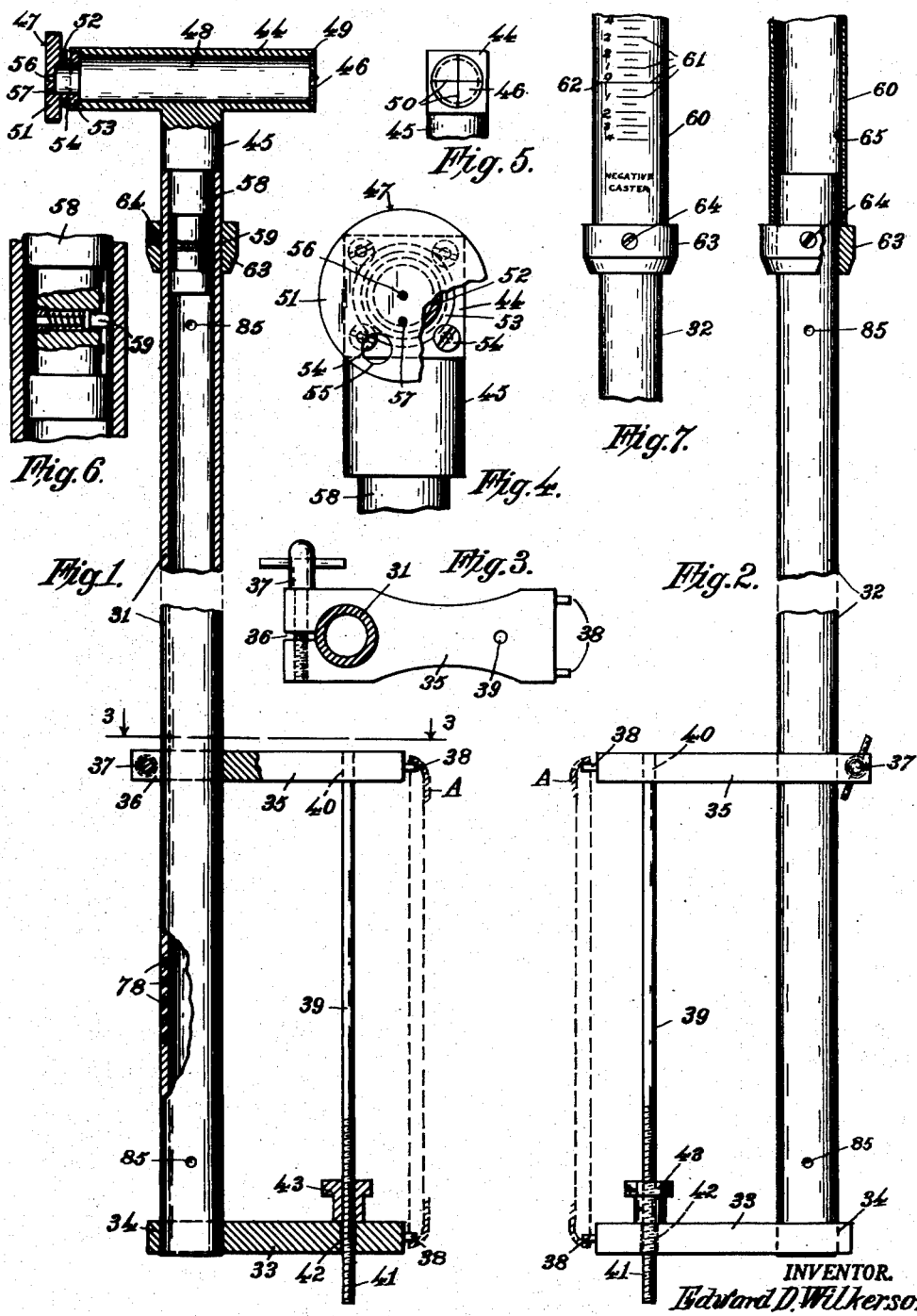

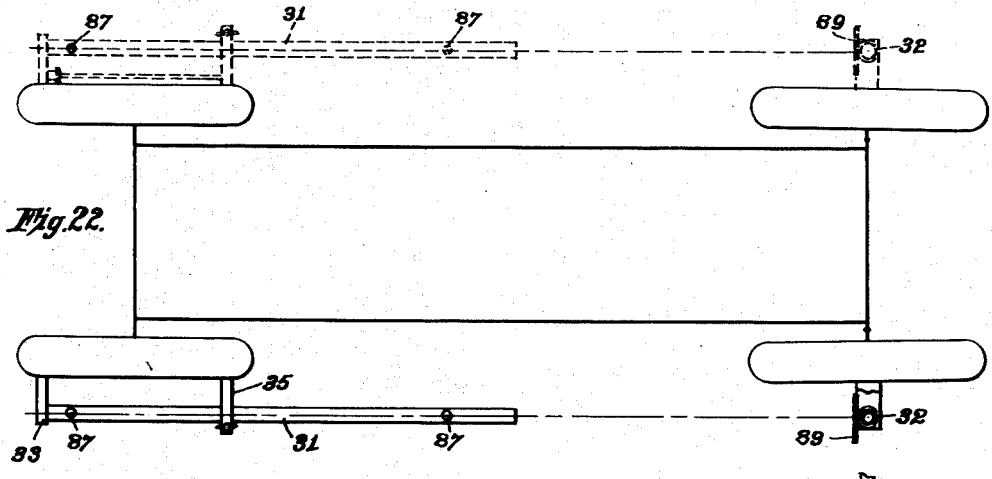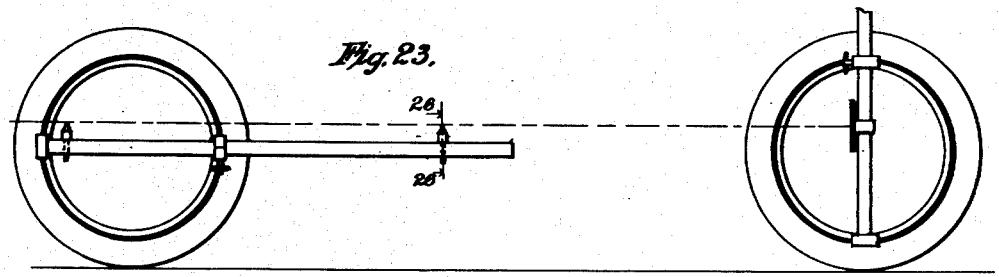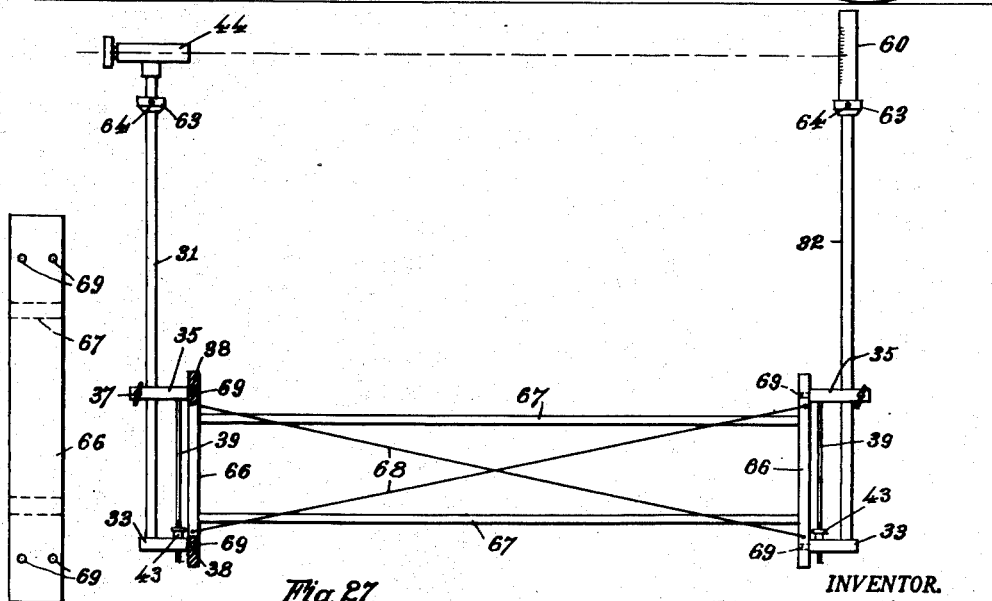

Patented Sept. 21, 1954

2,689,403

UNITED STATES PATENT OFFICE 2,689,403

VEHICLE WHEEL ALIGNMENT TESTING APPARATUS AND METHOD OF TESTING VEHICLE WHEEL ALIGNMENT

Edward David Wilkerson, Orange, N. J.

Application August 20, 1946, Serial No. 691,748

19 Claims. (Cl. 33—46)

The invention relates generally to vehicle wheel testing apparatus, and the purpose of the present invention is to provide a novel and simple device by means of which the camber, caster, toe-in, steering geometry and general alignment of the wheels of a vehicle may be readily and easily determined.

It is well known that the wheels of modern automobiles are positioned in accordance with certain standards, as to the factors above mentioned, as adapted for the most efficient road performance. All such factors are important and so inter-related that when one of said factors in inaccurate, the other factors are affected thereby, and sometimes a slight variation in one of said factors results in magnified inaccuracy in one or more of the other factors.

Means have heretofore been devised for making tests of the several factors stated; but these generally require separate means for making the different tests, and are frequently dependent upon gravity actuated means, such as plumb bobs; or the tests are made with relation to some extraneous fixed structure such as a vertical post or wall, or a horizontal support for the wheels. Such testing is not always reliable or satisfactory as several elements may unknowingly be present to interfere with the accuracy of these tests, such as a support that is not perfectly level, or unevenly inflated, or unevenly worn tires.

The object of my invention is to provide simple apparatus for making the several necessary tests which will not depend for accuracy upon extraneous elements such as supports or fixed parts, or even upon the conditions of the wheels or tires.

A particular object of this invention is to provide a method and means for testing the camber of the front wheels by checking their relation to each other without reference to extraneous objects.

Another object of the invention is to provide a novel method and means for testing the relative positions of the wheels in a horizontal plane, commonly referred to as "toe-in," by using each wheel as a base from which to check the opposite wheel.

A further object of the invention is to provide "toe-in" test, as stated, which will also provide means for testing the wheel base position of the front wheels with relation to the rear wheels and/or the chassis.

Another object of the invention is to provide a novel method, associated with the toe-in test, for testing the wheel base positions of the rear wheels in relation to the front wheels.

A further object is to provide a novel method and means for testing the caster of the steerable wheels.

A further and particular object of the invention is to provide a novel method and means for testing the several position factors of a pair of wheels without the necessity of any physical connections between the wheels or between the portions of the apparatus associated with each wheel.

Other objects will appear hereinafter.

With these objects in view the invention consists generally in a pair of elongated members or posts, means for clamping said members radially to the opposite wheels respectively of a vehicle in a plane parallel with the planes of the respective wheels, a graduated target on one of said posts and a sighting device on the opposite post for reading the graduation on said target.

The invention further consists in a method of testing factors of wheel positions of a pair of normally connected vehicle wheels, by utilizing one of the wheels as a base upon which to support a target, and the other wheel as a base upon which to support means for projecting a line therefrom to said target, whereby the position of said projected line relative to said target will indicate the factor of the wheel being tested.

The invention further consists in various details of construction, and combinations and arrangements of parts as will be described hereinafter and particularly pointed out in the claims.

The invention will be more readily understood by reference to the accompanying drawings, forming a part of the specification and in which, Figure 1 is an elevation, partly in section of one of the posts forming a part of the testing device, including the means for clamping the post to a wheel rim, and with the sighting device mounted thereon.

Figure 2 is a similar view of the other post, and its clamping means, and illustrated with the target mounted thereon.

Figure 3 is a section on the line 3—3 of Figure 1.

Figure 4 is a detail fragmentary end view of the sighting device, upon an enlarged scale.

Figure 5 is an elevation of the opposite end of the sighting device.

Figure 6 is a detail vertical section of a portion of the stem of the sighting device.

Figure 7 is a detail face view of the target.

Figure 10 is a plan view of a pair of steerable wheels illustrating the method of testing caster.

Figure 11 is a diagrammatic end view of the same, with the wheels cut in the opposite direction from that indicated in Figure 10.

Figure 12 is a detail illustrating a pointer used as part of the apparatus in making he caster test.

Figure 13 is a vertical view of the same, partly in section, taken at right angles to that illustrated in Figure 12.

Figure 14 is a plan view of a protractor plate used in conjunction with the pointer.

Figures 18 and 19 are illustrations of a modified form of the testing device.

Figure 20 is a detail view of the chart as used in a cylindrical target or chart tube.

Figure 21 is a vertical section of the cylindrical target with the chart therein, and provided with illuminating means to facilitate reading of the chart.

Figure 22 is a diagrammatic plan view illustrating the method of using the device to test wheel base position of the rear wheels.

Figure 23 is a side elevation of the same.

Figure 24 is a detail elevation illustrating the target used in the test illustrated in Figures 22 and 23.

Figure 25 is a section on the line 25—25 of Figure 24.

Figure 26 is a detail section on the line 26—26 of Figure 23, illustrated upon an enlarged scale.

Figure 27 is an elevation of a calibrating device in setting the device prior to use in the several tests.

Figure 28 is an elevation of one of the vertical elements of the calibrating device, upon an enlarged scale.

Figure 8:
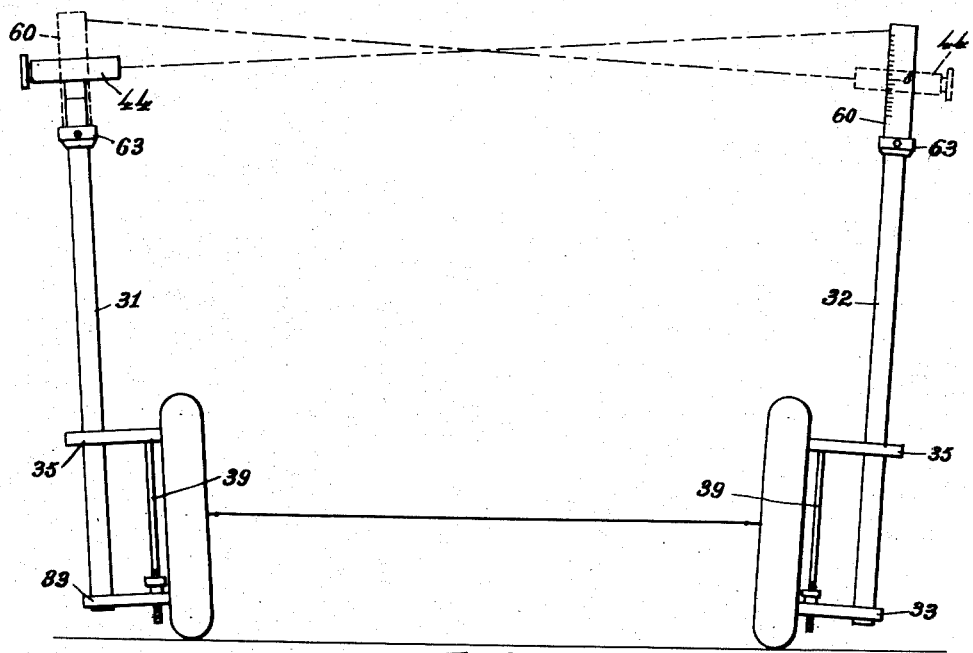
Figure 8 is a diagrammatic view illustrating the method of using the invention in testing the camber of a wheel.

As hereinbefore stated, the device embodying the present invention comprises generally a pair of elongated members or posts adapted to be secured radially to opposite wheels of a vehicle, in planes parallel with the planes of said wheels, and means on said members whereby a line projected from one thereof may be read upon a graduated element carried by the other member, and the result thereby directly obtained. The said projected line may be a line of vision through a sighting device, or a beam of light, each of which will be fully described hereinafter.

Referring to the drawings, particularly to Figures 1 to 7 inclusive, 31 and 32 indicate a pair of elongated members or posts adapted to be secured to the opposite wheels respectively of a vehicle. These members are similar, and are provided adjacent one end with clamping means for attaching them to the rims of the wheels so that they lie parallel to the planes of the outer edges of the wheel rims and diametrically thereof. As these clamping devices are identical a detail description of one will suffice for both. Each clamp comprises an arm 33, press fitted or otherwise rigidly secured to one end of the respective tubular member as at 34, and a parallel arm 35 slidably mounted on said member. The outer end of the arm 35 is bifurcated as at 36 and provided with a clamp screw 37 for securing the arm in adjusted position. The inner ends of said arms 33 and 35 are each provided with a pair of pins 38 to engage under the lip A of a wheel rim, and the lengths of said arms from the tubular member to the said pins are uniform so that when the device is attached to the wheel rim the tubular members 31 and 32 will lie in a plane parallel with the plane of the wheel. A spreader rod 39 has its upper end securely attached to the clamp 35, as at 40, and has a threaded lower end 41 extending through a bore or perforation 42 in the arm 33. A sleeve nut 43 is threaded on the rod and bears against the inner face of the arm 33, providing means for forcing said arms apart until the pins 38 firmly impinge against the inner face of the rim flange thereby clamping the device to the wheel.

A sighting device is provided which may be mounted upon the upper end of either of the members 31 or 32. This comprises an elongated body portion 44, a depending stem 45, a crosshair line lens 46 and a rotary eye piece 27. The body 44 is preferably square in cross section and is provided with a bore 48 which is counter-sunk at one end as at 49 to receive the lens 46 having the crossed hair lines 50. The eye piece 47 comprises a disk 51 having a reduced neck portion 52 terminating in a flange 53 which is counter-sunk by screws 54, tapped into the end of the body 44, and an aperture 55 in the disk 51 provides access to the screws for the purpose of assembling. The eye piece is provided with a central sight opening 56, and an off center sight opening 57, the latter forming an adjustable sight by rotating the eye piece in its mounting, as will appear hereinafter.

The stem 45 of the sighting device is preferably integral with the body 44, and is formed with a reduced portion 58 which fits snugly but rotatably in the upper end of either of the members 31 or 32, so as to be swivelled thereon. As in using the device for certain tests the sighting device must be transferred from one of said members to the other, it is necessary that the stem may be readily removed from one member and inserted in the other, and that it be held in place with sufficient resistance to prevent accidental displacement. To this end the stem is shown as provided with a spring pressed plunger 59 which engages the inner face of the tubular post, although other suitable means may be provided for this purpose without departing from the scope of the invention.

For cooperation with the sighting device is a target 60 which is interchangeably mounted on the end of the opposite member 31 or 32 from that upon which the sighting device is mounted. In the form illustrated in Figures 2, 7, 20 and 21, and in most of the test diagrams, the target comprises a tubular member 60 having graduations 61 and telescopically mountable over the end of either of the posts 31 or 32 with its lower end resting upon an adjustable collar 63. Said collar is held in adjusted position by a set screw 64.

Preferably, the target member is formed of any suitable material such as transparent plastic, and the graduations are printed upon a sheet 65 of flexible material, such a paper, which is rolled and secured to the inner face of the transparent tube. In order that one target member may be used for testing "camber," "caster," "toe-in" etc., the sheet is provided with several series of graduations, each suitable for a certain test, as illustrated in Figure 20; and the target member 50 may be rotated about its axis to present the desired graduations to the sighting device. To facilitate reading the target chart under some conditions, a light 60a may be located within the same as shown in Figure 21, and this may be connected to the battery of the car or other source of current supply.

In order that the device shall properly serve the purpose for which it is designed, the sighting device and the target must be calibrated so that when the members 31 and 32 are exactly parallel, and the clamping devices on both members are in exact alignment, the line of sight projected centrally through the sighting device will read zero on the target.

To calibrate the device any suitable means may be employed to hold the members 31 and 32 in parallel relation with the end arms 33 of the clamps in alignment. Such a device is illustrated in Figures 27 and 28 of the drawings. This comprises a pair of end plates 66 spaced apart approximately the standard car tread width, by bars 67, and said plates and bars are maintained in perfect rectangular relation by diagonal cross members 68. Holes 69 are provided in the plates to receive the rim engaging pins 38 of the clamping members. After the testing members are secured firmly in position on the plates 66, the target 60 which is telescoped over the end of one of the posts, is raised or lowered until the zero mark thereon is in alignment with the sighting device. This is done by adjusting the collar 63 on the post, and after the target is in position, the collar is secured in place by the set screw 64. The sighting device and the target are next transferred to the opposite members 31 and 32, and the adjustment of the other collar 63 and the target is made in like manner. The device is then ready for use.

The camber test

In Figure 8 of the drawings is illustrated diagrammatically the method of testing the wheels for camber. For making this test the members 31 and 32 are clamped to the rims of the opposite wheels and the target 60 is positioned on the end of one of said members and the sighting device on the other member, as shown in full lines in said figure. A direct reading on the target 60 through the center sight opening will give the camber of the wheel upon which the sighting device is mounted. This will be accurate irrespective of the camber of the opposite wheel as any variation in the camber of the wheel upon which the target is mounted will not appreciably vary the vertical radial distance from the center of the wheel to the 0° graduation on the target while any variation of the angle of the post upon which the sighting device is mounted will make a noticeable variation in the reading on the target. It is therefore evident that the test will be accurate irrespective of the evenness or unevenness of the wheel supports or floor, or of the relative inflation and tread wear of the tires.

After the first reading is ascertained as above described, the sighting device 44 and the target 60 are interchanged on the posts 31 and 32, and a second reading is made in like manner as the first, which will give the camber of the wheel upon which the sighting device is now mounted.

Figure 9:
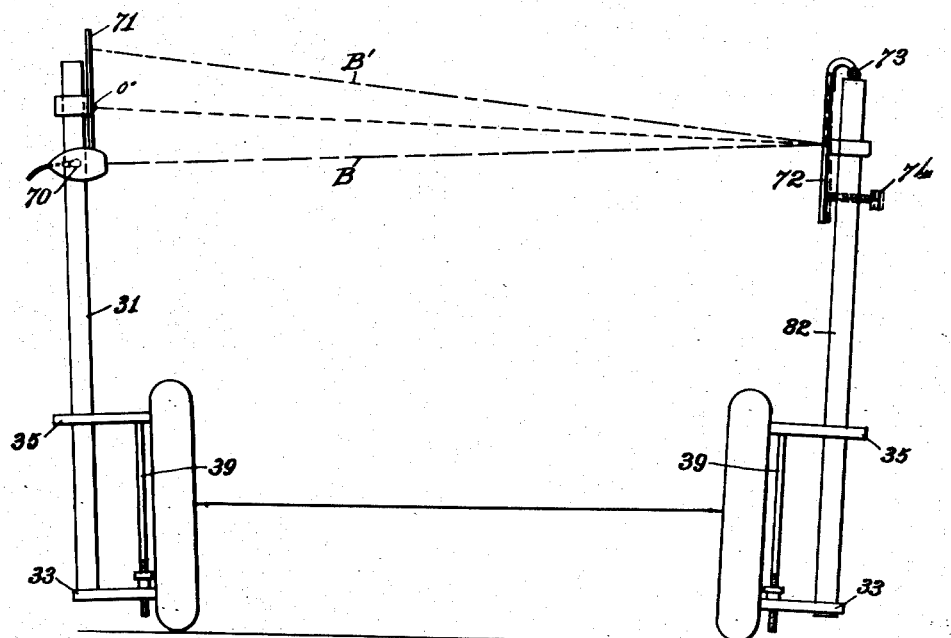
Figure 9 is a similar view illustrating a modified form of the device.

A modification of the testing device and the method of testing camber, is illustrated in Figure 9. As shown therein, the sighting device is replaced by a lamp or illuminating device 70 and a target 71, and the target 60 is replaced by a mirror 72. The lamp 70 throws a beam B at right angles to the post upon which it is mounted, onto the mirror 72 which reflects the beam back, as at B', upon the graduated target 71 giving a direct reading on the target. According to the laws of reflection, this form will double the sensitivity of the device.

The mirror 72 may be hingedly mounted on the post as at 73 and be angularly adjusted by a set screw 74 or other suitable means, so that after the proper camber is ascertained from the specifications of the car, the mirror may be set so that when the wheel is properly adjusted, the beam B' will be directed back, either to the source of light or to the zero or other mark on the target, as desired.

The caster test

To test caster, which is the camber of the wheels when "cut" as in steering, the apparatus is arranged substantially as for the camber test, except that the target or chart tube 60 is turned until the "caster" scale is toward the sight head. The wheels are then cut in one direction a predetermined angle, as illustrated in Figure 10, and since in cutting, the wheels rotate a slight amount on their spindles, means must be provided for accurately ascertaining the degree of "cut." For this purpose, a pendulum pointer 75 is attached to each post 31—32 by a pivot pin 76 which is arranged in alignment with the center axis of the respective wheel, and a protractor plate 77 is positioned on the floor or ground under each pointer. Each protractor plate is provided with an arcuate scale 78 divided into degrees from a central 0° point, which point is positioned directly beneath the pointer when the wheels are positioned straight ahead as in driving.

A series of apertures 78 are provided in the posts 31 and 32 into which the pivot pins 76 are selectively threaded. These apertures are positioned so as to lie in line with the center of the wheel spindles when applied to wheels of different diameters, respectively, and the pointer is provided with a telescopic end 79 enabling the pointer to be adjusted accordingly so as to extend close to the protractor irrespective of which aperture 78 is used.

After the wheels are cut, the posts 31 and 32 extend angularly upwardly in opposite directions as shown in Figures 10 and 11, due to the rotation of the wheels on their spindles as above stated. It is therefore necessary that the sighting head be turned on its vertical axis toward the target or chart tube; and in order to bring the cross hair lines into alignment with the 0° mark on the chart, the off-center sight opening 57 is used and the disk 51 turned until the crosslines appear to cut said mark. The wheels are then cut in the opposite direction the same angular distance and the "caster" read on the chart after turning the sight head on its vertical axis without changing the position of the sight opening 57. To test "caster" of the other wheel, the method is repeated with the target and sighting device arranged on the opposite posts, and the angle of cut read from the protractor plate on the opposite side from that read in the first test.

The toe-in test

Figure 15:
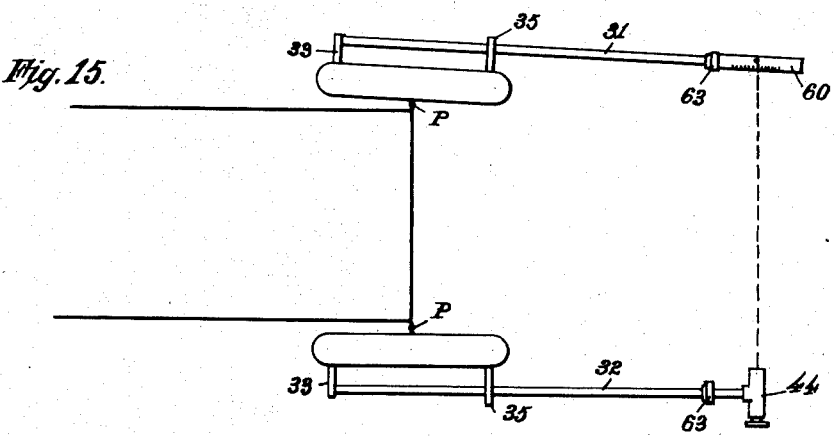
Figures 15 and 16 are diagrammatic plan views illustrating the method of using the device to test "toe-in" of the steerable wheels.
Figure 16:
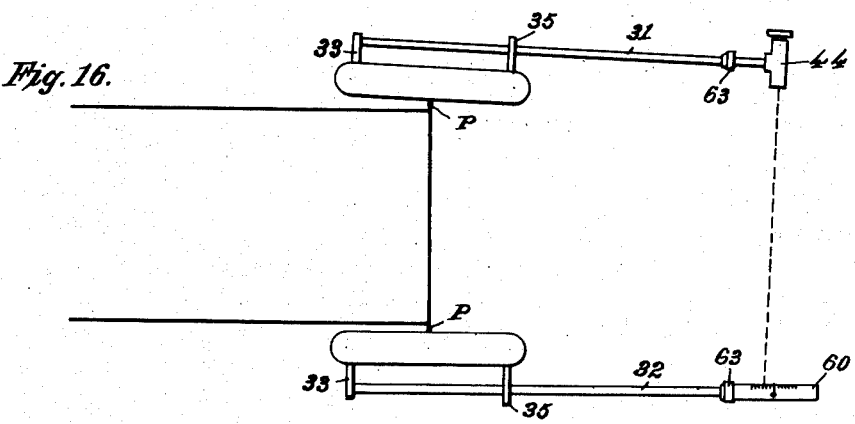

The toe-in test is illustrated diagrammatically in Figures 15 and 16. For this test the apparatus is attached to the front wheels of the vehicle as in the camber test, but positioned to extend horizontally and directly forwardly of the vehicle. After the posts 31 and 32 are secured to the front wheels respectively, the chart tube 60 is turned with the "toe-out—toe-in" chart toward the sighting head 44, and the wheels are cut slightly to bring the line of sight passing through the central sight opening and crossed hair lines to read 0° on the chart. This will bring the axis of sight of the sight head parallel with the front axle. The sight head 44 and chart tube are then interchanged and the "toe-in" of the wheel upon which the sight head is not located is read directly from the chart.

The wheels are then cut in the opposite direction until the reading is again 0°, after which the positions of the sight head and chart tube are again interchanged and the "toe-in" of the other wheel read from the chart.

Wheel base position of front wheels

Figure 17:
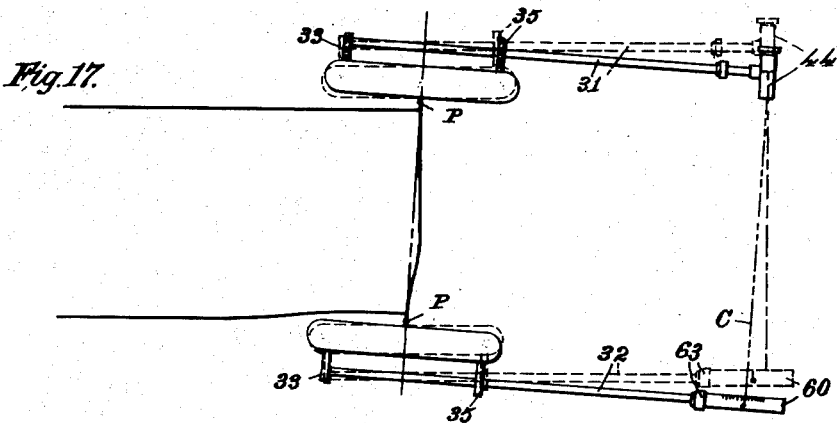
Figure 17 is a similar diagrammatic view illustrating the method of checking the wheel base position of a front wheel.

In making the "toe-in" test as above described, it will be impossible to bring the sight reading to 0° with the line of sight parallel with the normal axle position, that is perpendicular to the longitudinal axis of the chassis if the axle and frame is bent to bring the king pin rearward of its proper position, as illustrated in Figure 17. To get the 0° sighting, it is necessary to cut the wheels considerably toward the target side to get such reading, and the line of sight "C" will then parallel a straight line through the wheel pivot points P—P. This will indicate that the king pin is out of proper position.

Steering geometry

To test steering geometry, the posts 31 and 32 are clamped to the wheel rims as in the camber and caster tests, but the sighting head 44 and target chart 60 may be omitted as they are not to be used. The pivot pins 76 are located in the proper holes 78, according to the size of the wheels, and the pointers 75 adjusted accordingly. With the wheels straight ahead, the protractor plates 77 are positioned beneath the pointers with the zeros directly under the points. The wheels are then cut in either direction an optional number of degrees as indicated by the protractor on the side toward which it is turned, and the number of degrees which the wheel on the opposite side turns will be indicated on the protractor on that side by the respective pointer. In this manner the angle through which either wheel turns relative to the angular turn of the other wheel may be readily and directly ascertained.

With apparatus as above described, it is evident that to arrange the same to take the camber and caster test after having taken the toe-in test, or vice versa, it is necessary to remove the devices from the wheels and re-apply them at a different angle, or to move the car forwardly or backwardly to change the position from vertical to horizontal or the reverse, as the case may be. This may be eliminated by a slight modification in the apparatus, and in Figures 18 and 19 such a modification is illustrated.

As shown in said figures, short posts 31a and 32a are substituted for the longer posts 31 and 32, and these are provided with the clamping devices identical with those in the form hereinbefore described. Slidably mounted on each of the shorter posts is a sleeve 80 having an outwardly extending spindle 81 upon which is pivotally mounted a hub 82 having a radial socket 83. Fixed in the socket 83 is a post 31b or 32b, upon the outer ends of which are mounted the sighting device and the target respectively as in the first described form. A spindle nut 84 locks the pivotal post section in the desired angular position and a set screw 84' is provided for securing the sleeve 80 in position with the spindle 81 in alignment with the spindle of the wheel. It will be clear with this form of the device each post is formed of two parts, an inner short section and a main outer section pivotally connected, so that after camber or caster, or toe-in has been tested, the outer section may be swung into position for the other test or tests.

Test for rear axle wheel positions

To check the wheel base positions of the rear axle, one of the posts 31 or 32 is secured in vertical position to one of the front wheels, and the other post is secured in a horizontal position to the rear wheel on the same side, as illustrated in the diagrams Figures 22 and 23. In the posts 31 and 32, preferably adjacent the ends thereof, are perforations 85 to receive the shanks 86 of two sighting pins 87 having tapered or pointed upper ends 88. See Figure 26. Attached to the vertical post on the front wheel and faced toward the rear is a target 89 having a plurality of concentric circles. See Figures 24 and 25. The sighting pins 87 are checked for position by sighting them against the target, and if the rear axle is at right angles to the chassis the reading will be zero on the target. The apparatus can then be moved to the other side of the car and the rear wheel on that side checked which will be a double check on the rear axle.

While I have described certain forms of the testing device for accomplishing the objects of the invention, it is to be understood that various changes may be made in the details of construction and arrangement of parts without departing from the spirit and scope of the invention as described and claimed.

I claim:

1. In a wheel testing device of the class described, a pair of posts, means for attaching said posts to opposite wheels of a vehicle respectively in planes parallel with the respective wheels, a graduated member and a sighting device interchangeably mountable on said posts, said graduated device comprising a cylindrical member adapted to telescopically engage the post, means on each of said posts to accurately position said member therein, and said sighting device being swiveled on the post and having a line of vision at right angles to the axis of the swivel.

2. In a wheel testing device of the class described, a pair of posts, means for attaching said posts to opposite wheels of a vehicle respectively in planes parallel with the respective wheels, a target and a sighting device interchangeably mounted on said posts, said target comprising a graduated cylindrical member adapted to telescopically engage the post, collars on said posts upon which the end of said member rests, and said sighting member having an axis of vision at right angles to the post upon which it is mounted.

3. In a wheel testing device of the class described, a pair of posts, means for attaching said posts to opposite wheels of a vehicle respectively in planes parallel with the respective wheels, a target and a sighting device interchangeably mountable on said posts, said target comprising a graduated cylinder adapted to telescopically engage the post, adjustable collars on said posts to position said target, and said sighting device comprising a body portion and a depending stem removably swiveled to the post upon which it is mounted, said body having a bore at right angles to said stem, a hair line lens at one end of said bore, a swiveled eye-piece at the other end of said head, said eye-piece having an axial sight opening and an off-set sight opening.

4. In a device of the class described, a pair of posts, means for securing said posts to a pair of vehicle wheels in planes parallel with the respective wheels, a graduated target and a sighting device interchangeably mounted on said posts, said sighting device comprising a body portion and a depending stem removably swiveled in the post upon which it is mounted, said body having a bore at right angles to said stem, a hair line lens at one end of said bore, and a swiveled eye-piece comprising a disc having a reduced neck portion terminating in an annular flange countersunk in the end of the body opposite the said lens, screws tapped into said body and having heads overjutting said flange, said disc having a central sight opening and an off-set opening.

5. A device as set forth in claim 4 further characterized by an aperture in said disc giving access to said screws.

6. In a device for testing wheel characteristics of a pair of vehicle wheels, a pair of posts, means for attaching said posts to the wheels respectively diametrically of and in planes parallel with the respective wheels, said posts having a series of apertures, each aperture being located to be centered with the spindle of a wheel of given diameter, a pin attachable selectively in said apertures, and a pendulum pointer depending from said pin.

7. In a device for testing wheel characteristics, of a pair of vehicle wheels, a pair of posts, means for attaching said posts to the wheels respectively diametrically thereof, said posts having a series of apertures, each aperture being located to be centered with the spindle of a wheel of a given diameter, a pin attachable selectively in said apertures, and a pendulum pointer depending from said pin, in combination with a protractor plate adapted to be supported directly beneath said pointer.

8. In a device for testing wheel characteristics of a pair of vehicle wheels, a pair of posts, means for attaching said posts to the wheels respectively diametrically thereof, said posts having a series of apertures, each aperture being located to be centered with the spindle of a wheel of a given diameter, a pin attachable selectively in said apertures, and a pendulum pointer depending from said pin, in combination with a protractor plate adapted to be supported directly beneath said pointer, and said pointer being adjustable in length for use in conjunction with wheels of different diameters.

9. A wheel testing device of the class described comprising a pair of posts, means for attaching said posts to opposite wheels of a vehicle respectively diametrically thereof, said posts each having a series of apertures, each of said apertures being located to be centered with the spindle of a wheel of given diameter, a pin attachable selectively in said apertures of both said posts, and a pendulum pointer depending from each of said pins, a graduated target and a sighting device interchangeably mounted on said posts, said sighting device having a stem swiveled in the end of the post upon which it is mounted, and having an eccentrically positioned sight aperture, and protractor plates arranged beneath each of said pointers.

10. In a wheel testing device of the class described, a pair of posts, means for attaching said posts to the opposite wheels of a vehicle respectively in planes parallel with the respective wheels, a target member and a sighting member interchangeably supported on said posts, said target member comprising a cylinder telescopically and rotatably supported on the end of the respective post and having a plurality of series of graduations adapted to be selectively presented toward the sighting device by rotating the cylinder.

11. In a wheel testing device of the character described, a pair of posts, means for attaching said posts to opposite wheels of a vehicle respectively, a sighting device and a target interchangeably mounted on said posts each a predetermined definite distance from the center of the respective supporting wheel, said target comprising a translucent cylindrical member having graduations including a zero mark thereon, and illuminating means in said member.

12. In a wheel testing device of the class described, an instrument supporting post formed of two tubes pivotally and slidably connected, means for attaching one of said tubes to a wheel diametrically thereof and in a plane parallel therewith, means for securing the other of said tubes at one of its ends in adjusted position on the first said tube, and an instrument carried at the free end of said other tube.

13. In a wheel testing device of the class described, an instrument supporting post formed of two tubes, means for securing one of said tubes to a wheel diametrically thereof and in a plane parallel therewith, a sleeve slidably mounted on said one tube, a spindle on said sleeve, the other said tubes being pivotally mounted on said spindle, means for adjustably securing said other tube on said spindle, means for securing said sleeve on said one tube with said spindle in alignment with the spindle of the wheel, and an instrument on said other tube.

14. In a wheel testing device of the class described, a pair of elongated members, means for attaching each said member to a wheel of a vehicle parallel to the plane of the wheel and in any direction of projection radially with respect to the particular wheel axis, one of said members being adapted to be secured in horizontal position to a rear wheel when testing the wheel base alignment of the rear wheels, and the other member secured vertically to the front wheel on the same side, a pair of sighting pins on the horizontally arranged member and a target mounted upon the vertically arranged member.

15. The herein described method of testing caster of a pair of normally connected vehicle wheels consisting in utilizing one of the wheels as a base upon which to support a target at a predetermined definite distance from the center of said one wheel, and the other wheel as a base upon which to support at a predetermined definite distance from the center of said other wheel means for projecting a line from said means to said target, cutting said wheels a predetermined degree, adjusting said projecting means to bring said projected line into a certain relation to said target, cutting the wheels in the opposite direction to the same degree, and then noting the relation of the projected line to said target.

16. The herein described method of testing

"toe-in" of a pair of normally connected vehicle wheels consisting in utilizing one of the wheels as a base upon which to support a target, and the other wheel as a base upon which to support means for projecting a line therefrom to said target, cutting the wheels until the projected line intercepts a certain point on the target, interchanging the target and the projecting means, and noting the point now intercepted on the target by the projected line.

17. Means for testing the characteristics of one of a pair of the wheels at opposite sides of a vehicle, said means comprising a graduated member including a zero mark, means for mounting said member on one of the wheels and constituting the sole support for said member for placing the member a predetermined distance from the center of and beyond the periphery of said one wheel, a sighting device having an axis of vision, and means for mounting said sighting device on the other of said wheels and constituting the sole support for said device for placing the axis of vision thereof a predetermined distance from the center of and beyond the periphery of said other wheel and at a fixed angle to the plane of said other wheel so that a user of the testing means can sight said graduated member along said axis, said sighting device being turnable on its support about an axis paralleling the plane of the wheel on which it is supported and having its axis of vision directed at an angle to said turning axis.

18. The herein described method of testing camber of one of a pair of normally connected wheels at opposite sides of a vehicle consisting in utilizing one of the wheels as a base upon which to support a target, placing the target at a predetermined definite distance radially outward from the center of said one wheel, and utilizing the other wheel as a base upon which to support means for projecting a line from said means across to said target, and placing the line projecting means the same predetermined definite distance radially outward from the center of said other wheel as the target is spaced from said one wheel, whereby the position of said projected line relative to said target will indicate the factor of the wheel being tested.

19. In apparatus for testing the wheels at opposite sides of a vehicle, a pair of posts, means for attaching one post to one wheel to derive its sole support from the wheel and to extend diametrically and parallel the plane of the wheel and well beyond the periphery of the wheel, means for attaching the other post to the other wheel to derive its sole support from said other wheel and to extend diametrically and parallel the plane of said other wheel and well beyond the periphery of said other wheel, a graduated member including a zero mark and mounted on one of said posts a predetermined distance from the center of the particular supporting wheel and beyond the periphery of said particular supporting wheel, and a sighting device mounted on the other post a predetermined distance from the center of the other wheel and well beyond the periphery of said other wheel for projecting a line of vision onto said graduated member, said sighting device turnable on its mounting about an axis paralleling the plane of the wheel whereon the sighting device is supported, and comprising an elongated tube having crossed hairs at one end and a sighting opening at the other end and cooperating with said hairs in providing a normal central line of vision projected at right angles to said turning axis, and said elongated tube also having a rotatable disk thereon equipped with a sighting opening disposed off center with relation to the before mentioned sighting opening so as to cooperate with said hairs in providing an auxiliary line of vision movable conically about the central line of vision by rotation of said disk.

References Cited in the file of this patent

UNITED STATES PATENTS

| Number | Name | Date |
|---|---|---|
| 685,455 | Kinkead | Oct. 29, 1901 |
| 700,717 | Bostrom | May 20, 1902 |
| 1,599,347 | Purkey | Sept. 7, 1926 |
| 1,971,702 | Burgan | Aug. 28, 1934 |
| 1,974,006 | Bennett | Sept. 18, 1934 |
| 1,980,487 | Kluader | Nov. 13, 1934 |
| 2,032,399 | Button | Mar. 3, 1936 |
| 2,061,326 | Morse et al. | Nov. 17, 1936 |
| 2,088,539 | Stokenbury | July 27, 1937 |
| 2,190,709 | Friestedt | Feb. 20, 1940 |
| 2,249,226 | Peters | July 15, 1941 |
| 2,285,965 | Halstead | June 9, 1942 |
| 2,292,969 | Peters | Aug. 11, 1942 |
| 2,466,698 | Getler | Apr. 12, 1949 |
| 2,475,502 | Holmes | July 5, 1949 |

FOREIGN PATENTS

| Number | Country | Date |
|---|---|---|
| 706,333 | France | Mar. 30, 1931 |
| 585,630 | Germany | Oct. 9, 1933 |
| 455,440 | Great Britain | Oct. 21, 1936 |
| 535,330 | Great Britain | Apr. 7, 1941 |